United States Patent Office 2,792,051
Patented May 14, 1957

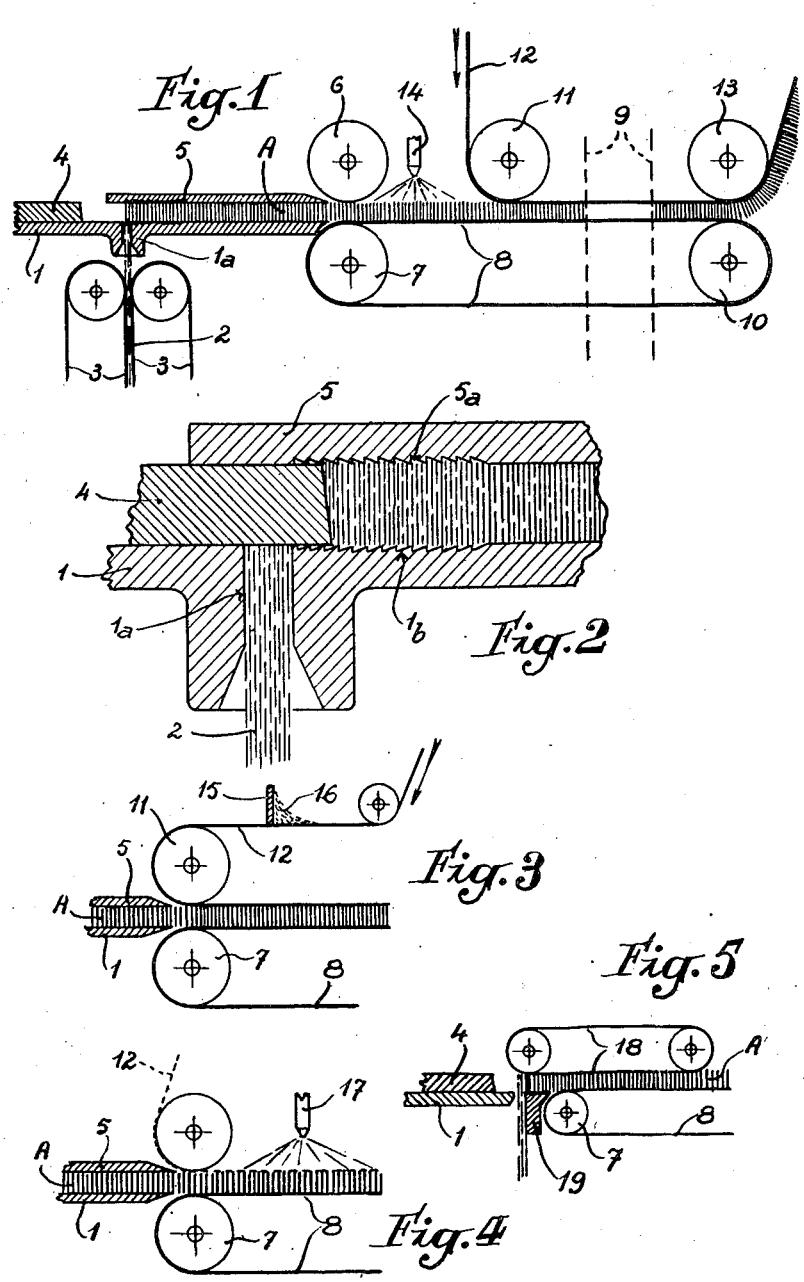

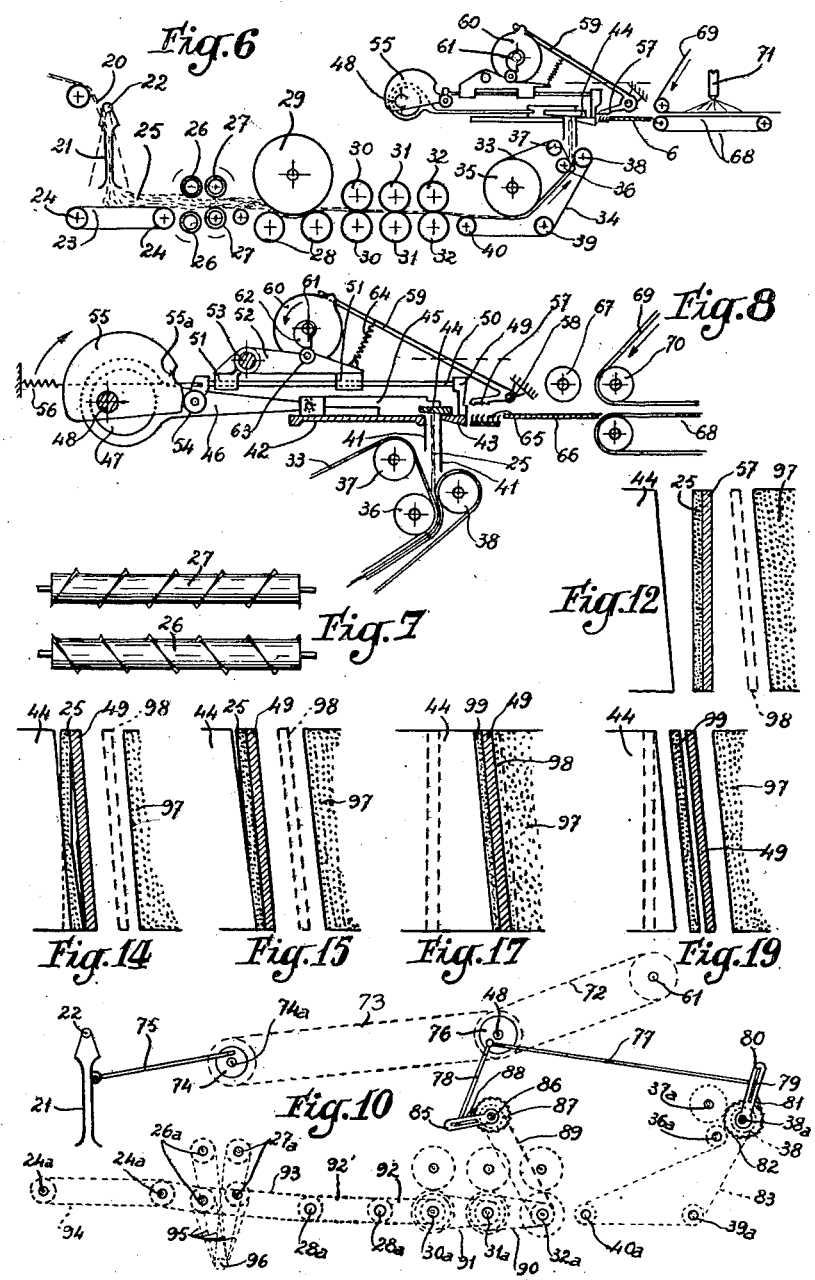

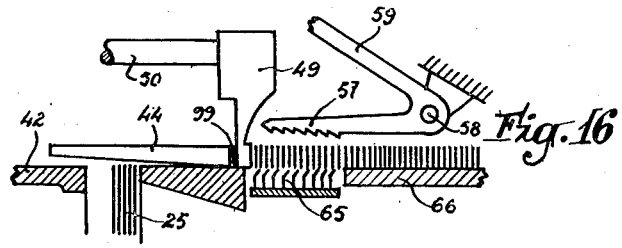
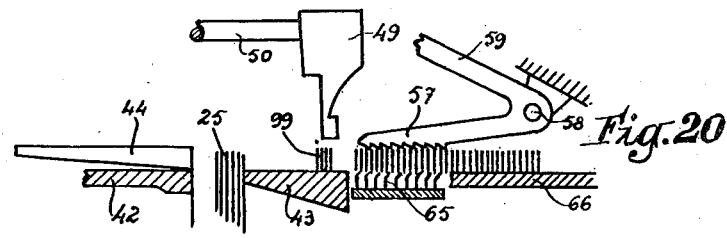
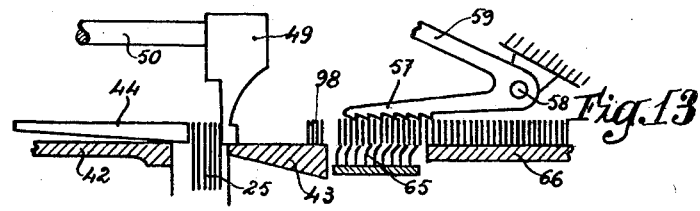
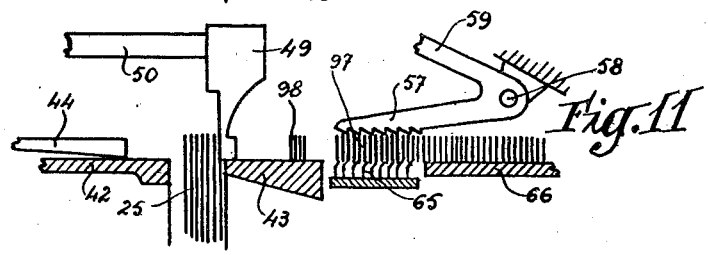
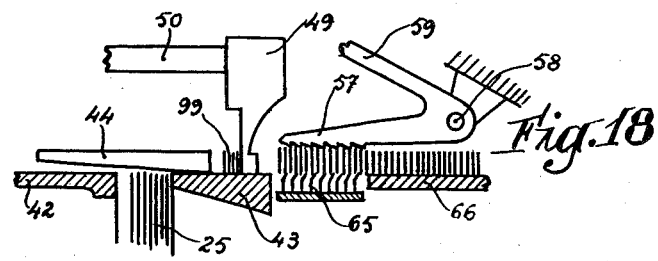

2,792,051

MACHINES FOR THE MANUFACTURE OF PILE ARTICLES

Camille Jacquet, Saint-Victor-de-Cessieu, France, assignor to Société à responsabilité limitée: "Etablissements Giroud Frères, les Successeurs de Hugues Giroud & Cie," Vienne (Isère), France, a French limited liability company Application July 26, 1955, Serial No. 524,373

Claims priority, application France August 12, 1954

12 Claims. (Cl. 154—1.1)

My invention relates to machines for the manufacture of pile articles such as velvets, carpets and the like, by applying on a fabric or other kind of support a layer of fibres of substantially equal length, disposed perpendicularly to the faces of the layer.

It is known to form the layer of fibres by cutting in a sheet of longitudinally parallelized fibres a series of successive transverse bands and by transversely engaging these bands into an appropriate guide wherein they form a continuous mass which issues from the guide under the form of the desired layer to be applied onto the fabric or the like and to be glued thereon. The drawback of this method is that as soon as a transverse band is engaged into the guide it tends to return backwards under the action of the mass of fibres which is compressed within the guide and which tends to expand. A substantial proportion of the fibres of the band are thus disarranged and become more or less oblique with respect to the faces of the mass or layer, whereby a defective article is finally obtained.

It has been proposed to retain the fibres by inserting transverse blades between the successive bands, the said blades being removed after the fibre layer has been applied and glued onto the support. But the automatic insertion of such blades into the guide at each operating cycle of the machine and their subsequent removal from the finished article require extremely complicated gearings and limit the operative speed of the machine. Moreover the blades determine transverse lines on the pile layer and these lines do not completely disappear during the finishing treatments of the article.

In the machine according to my invention the internal faces of the guide in which the fibre bands are engaged are provided with small projections which retain the ends of the fibres against the tendency of the fibrous mass to expand, while permitting advance of the said mass. The faces of the guide may have inclined teeth, in the form of ratchet teeth, so arranged as to permit the fibres to move forwardly but to prevent any backward movement thereof. The guide may be substantially horizontal and the upper wall thereof may be openable to receive each band of fibres and to close thereafter on the same.

In a preferred embodiment of my invention the machine comprises in front of a rectilinearly reciprocatable cutter a pusher member against which the band which is being cut is pressed by the cutter itself, the said pusher member being advanced with the cutter to maintain the said band under compression and at the same time to engage into the guide the band which had been cut during the preceding cycle of operation, and the said pusher member being raised during the return stroke of the cutter to pass above the last-cut band and to return to its initial position for the next stroke of the machine.

The machine according to my invention preferably comprises an electric device adapted to create a strong electrostatic field in the zone comprised between the cutting edge of the cutter and the inlet of the guide to maintain the fibres at the vertical position in the band which is to be engaged into the guide.

In the annexed drawings:

Fig. 1 is a diagrammatical vertical section of a first embodiment of a machine according to my invention.

Fig. 2 is an enlarged fragmental section showing the cutter at the fore end of its stroke.

Figs. 3 to 5 are diagrammatical fragmental views illustrating modifications of the machine of Fig. 1.

Fig. 6 is a general diagrammatical view of another embodiment of my invention.

Fig. 7 is a fragmental plan view showing the lower smoothing rollers.

Fig. 8 is an enlarged sectional view of the portion of the machine of Fig. 6 comprising the cutter, the guide and the parts associated thereto.

Fig. 10 is a general diagrammatical view illustrating the main driving gearings in the machine of Fig. 6.

Fig. 11 is a detailed diagrammatical view illustrating the main parts adapted to cut the successive fibre bands and to form a continuous layer therefrom, these parts being shown at the beginning of an operative cycle.

Fig. 12 is a diagrammatical plan view corresponding to Fig. 11.

Figs. 13 and 14 are views similar to Figs. 11 and 12 but showing the parts at the next step of the cycle.

Fig. 15 is a view similar to Fig. 14, but wherein the compressibility of the fibre band has been taken into account, while it had been neglected in Fig. 14.

Figs. 16 and 17 on the one side and Figs. 18 and 19 on the other side are views similar to Figs. 11 and 12 but corresponding to further successive steps of the operating cycle.

Fig. 20 is a diagrammatical view similar to Fig. 11 but showing the parts at the beginning of the return movement of the pusher member.

Figure 21:
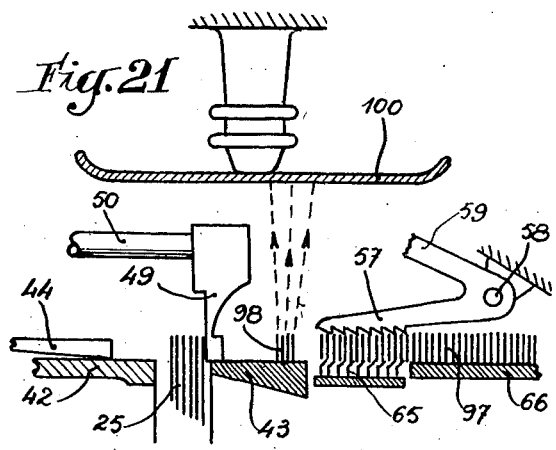

Fig. 21 is a view similar to Fig. 11, but illustrating a construction wherein an electrode is arranged to maintain the fibres at the vertical position by electrostatic action.

In the embodiment of Figs. 1 and 2 the machine comprises a horizontal table 1 provided with a transverse slot 1a through which is passed a vertical sheet 2 of longitudinally parallelized fibres. Such a sheet may be obtained for instance by superposition of a number of card webs. Sheet 2 is maintained between two endless bands 3 disposed under table 1 and which which guide and drive the said sheet. A cutter blade 4 is slidably disposed disposed on table 1 and it is movable perpendicularly with respect to sheet 2 in such a manner as to cut the end of the latter which projects above table 1. In Fig. 1 this cutter blade 4 is shown at its rearmost position while in Fig. 2 it has been illustrated at its foremost position. Cutter 4 may be driven by any appropriate mechanism, for instance by means of a connecting rod.

A plate 5 is horizontally disposed above table 1 at a distance therefrom which is equal to or somewhat greater than the thickness of the cutter blade 4, this plate extending forwardly (that is towards the right in Figs. 1 and 2) to form with table 1 a guide of reduced height and of a width equal to the width of sheet 2. This guide is closed by appropriate side plates, not illustrated.

At the outlet of the guide 1—5 there is arranged an upper roller 6 which is substantially tangent to the horizontal plane of the lower side of plate 5. Under roller 6 there is disposed another roller 7 which supports an endless band 8 the upper portion of which runs horizontally in the plane of table 1. Band 8 passes through an appropriate drier which has been very roughly indicated at 9, and it is returned by a roller 10.

At some distance in front of roller 6 there is arranged another upper roller 11, also tangent to the plane of the lower side of plate 5, and under this roller there is passed a fabric 12 which thence runs horizontally through the drier 9 towards an outlet roller 13.

A sprayer device 14 is disposed between rollers 6 and 11 for spraying downwardly an appropriate glueing solution, for instance a solution of latex.

The inner faces of the guide formed by table 1 and plate 5 are provided with small ratchet teeth 1b and 5a so disposed as to permit advance of the fibre mass within the guide, while preventing any backward movement thereof.

The operation is as follows:

The cutter blade 4 being at its rearmost position, as shown in Fig. 1, the endless bands 3 are first actuated to move sheet 2 upwardly through a distance substantially equal to the height of guide 1—5. Cutter 4 is thereafter advanced to cut the portion of sheet 2 which projects above table 1. The said portion is in the form of a transverse band of vertical fibres exactly equal in length. It is pushed by the fore edge of the cutter blade and engaged into guide 1—5. The cutter blade 4 is then returned backwards for a new operative cycle, and so on, the successive bands forming in guide 1—5 a mass A of vertical fibres which is progressively advanced and which issues from the said guide in the form of a continuous layer of parallel fibres disposed perpendicularly to the sides or faces of the layer. This layer passes under roller 6, its upper face receives a coating of glue from the sprayer device 14 and it is applied against the lower side of fabric 12. After passage through drier 9 there is obtained a pile article comprising a very regular layer of pile fibres.

It will be appreciated that within guide 1—5 the mass of fibres, which is under compression, tends to expand and to push backwards the last bands engaged into the guide by the cutter blade (position of Fig. 2). If the fibres of these last bands were not retained by teeth 1b and 5a, they would thus be returned towards the inlet of the guide, a substantial percentage thereof would fall to a more or less horizontal position during this backward movement and the pile article finally obtained would be quite irregular and unsatisfactory.

In the modification of Fig. 3 the supporting fabric 12 is directly passed on roller 11 and its pile side is coated with glue by means of a scraper 15 which retains a mass 16 of an appropriate pasty substance. In the modification of Fig. 4 fabric 12 is in the form of a somewhat loosely woven cloth which is directly passed under roller 6 as in Fig. 3, but without having previously been coated with glue. The glueing process is effected by a sprayer device 17 which delivers glue on the upper side of the portion of fabric 12 disposed on the layer or mass A of vertical fibres. Owing to the relatively large pores of fabric 12 the glueing solution permeates almost immediately and reaches the upper ends of the fibres which are thus fixed to the fabric.

In Fig. 5 the upper side of the guide is formed by an upper endless band 18, plate 5 being suppressed. The front portion of table 1 is reduced to a relatively narrow transverse member 19 the upper face of which is provided with ratchet teeth similar to the teeth 1b of Fig. 2. Band 18 may be formed of a coarse fabric to retain the upper ends of the fibres.

In the embodiment of Fig. 6 the machine receives a fleece 20 of parallelized fibres obtained, for instance, by superposition of two or three elementary webs continuously produced by carding machines. Fleece 20 passes through an oscillating guide 21 pivoted at 22 which delivers this web in the form of a succession of folds on an endless band 23 carried by rollers 24. The fibrous mass 25 thus formed then passes between two pairs of cylinders 26—26 and 27—27 the periphery of which has a helicoidal projecting rib as clearly indicated in Fig. 7 which illustrates the lower cylinders of both pairs. These cylinders rotate in the same direction to stretch the folds of mass 25 while disengaging the fibres which are curved at the ends of the folds, whereby mass 25 is rendered regular and smooth.

Mass 25 thence passes on two rollers 28 on which it is compressed by a heavy drum 29 which rests on the said rollers. The mass or sheet thus obtained is thereafter submitted to the action of drawing rollers 30, 31 and 32 which rotate at progressively increasing speeds to stretch the sheet and to regularize its constitution.

From rollers 32 sheet 25 is caught between two endless bands 33 and 34. The upper band 33 passes under a drum 35 of relatively large diameter, rises obliquely, passes on two successive rollers 36 and 37, and returns towards drum 35. Band 34 first follows the lower portion of band 33, then is returned downwardly by an upper roller 38, passes under a lower roller 39 and thence on an end roller 40 whereby it is returned against band 33. Bands 33 and 34 are driven in synchronism for ensuring advance of sheet 25.

Sheet 25 issues vertically from bands 33 and 34 and it passes between two vertical guides 41 (Fig. 8) and thus comes in front of a table 42 and behind a fixed cutter 43 the upper face of which forms a horizontal forward extension of table 42. The fixed cutter 43 is associated with a movable cutter 44 carried by a support 45 actuated by a pair of rods 46 (Figs. 8 and 9) driven by eccentrics 47 keyed on one and the same transverse driving shaft 48. Support 45 is of course appropriately guided in horizontal guides 42a disposed on each side of table 42. A pusher member 49 extends transversely in front of cutter 44 and its ends are articulated about a substantially vertical axis to the fore ends of two longitudinal rods 50, each rod 50 being slidable in guides 51 in one with a support 52. Both supports 52 are carried by one and the same transverse shaft 53.

Each rod 50 carries at its rear end a loose roller 54 which is adapted to cooperate with the periphery of a cam 55 keyed on shaft 48. A spring 56 acts on each rod 50 to return the corresponding roller 54 against the corresponding cam 55.

In front of pusher member 49 there is disposed a substantially horizontal flap 57 carried by a slightly oblique shaft 58 provided at both ends with an arm 59 having a curved end which bears against the periphery of a cam 60, both cams 60 being carried by the same transverse shaft 61. The lower side of flap 57 is provided with small inclined teeth directed forwardly. The above-mentioned transverse shaft 61 also carries two cams 62, each cooperating with a roller 63 supported by the adjacent support 52. Each arm 59 is connected with the adjacent support 52 by a spring 64 so disposed as to maintain arm 59 against cam 60 and roller 63 against cam 62.

Below flap 57 and in front of the fixed cutter 43 there is disposed a steel wire lining 65 with the ends of the wires bent towards the front of the machine, as clearly shown in Fig. 11. Beyond this lining there is disposed a fixed table 66 above which a roller 67 is arranged. An endless band 68 runs longitudinally in front of table 66.

The fabric 69 onto which the pile layer is to be applied passes under a cylinder 70 and runs horizontally above band 68 towards a drier not illustrated. Above the horizontal portion of fabric 69 are arranged sprayers 71 (Fig. 6) which spread an appropriate glueing solution (latex, condensable resins, etc.).

The machine described is driven from shaft 48. A first chain 72 (Fig. 10) connects a sprocket carried by shaft 48 with another sprocket keyed on shaft 61. Another chain 73 connects a sprocket on shaft 48 with a sprocket on the shaft 74a of a rotating plate which drives the oscillating guide 21 by means of a link 75.

Shaft 48 also carries an end plate 76 which drives two links 77 and 78.

Link 77 acts on a pin 79 adjustable on an arm 80 loose on the shaft 38a of roller 38. The said arm 80 carries a pawl 81 which cooperates with a ratchet wheel 82 keyed on shaft 38a. the latter is in turn connected by a chain 83 with the shafts of rollers 36, 39 and 40 for driving bands 33 and 34. In order to simplify the drawings Fig. 10 only shows the shafts of the various rollers, which have been referenced 36a, 39a, 40a, etc. Plate 76 is so timed that wheel 62 only rotates when the movable cutter 44 of Fig. 8 has cleared the upper outlet of guides 41 to permit upward movement of sheet 25. The shaft 37a of roller 37 is connected through a pair of gears with the shaft 38a of roller 38. The drum 35 of Fig. 6 is loose.

In actual practice it may be of advantage to replace the pawl and ratchet wheel device 81—82 by a unidirectional frictional mechanism.

Link 78 likewise actuates in an adjustable manner an arm 85 loose on a shaft 86 which carries a ratchet wheel 87 driven by a pawl 88 supported by arm 85. A chain 89 connects shaft 86 with the shaft 32a of the lower drawing roller 32, shaft 32a being in turn connected by chains 90 and 91 with the shafts 31a and 30a of the lower rollers 31 and 30, the corresponding sprockets being such that the rotational speed increases from rollers 30 to rollers 32, as above explained. Each upper roller is connected by a pair of gears with the corresponding lower one.

Chains 92 and 92' connect the shaft 30a of the lower roller 30 with the shafts 28a of rollers 28. Chains 93 and 94 connect the right-hand shaft 28a with the shafts 24a of rollers 24.

The shafts 26a, 27a of the smoothing cylinders 26 and 27 are driven by means of belts 95 from one and the same shaft 96, the latter being in turn driven by a variable speed electric motor.

The outlet endless band 68 is driven by any adjustable mechanism and the driving rollers of the fabric 69 are driven in synchronism with band 68.

The general operation of the machine of Fig. 6 is as follows:

The fleece 20 (Fig. 6) is delivered on band 23 in the form of successive folds which form a fibrous mass 25, the latter being progressively transformed into a regular and smooth sheet of longitudinal fibres. It is to be remarked that the drawing rollers 30, 31 and 32 of Fig. 6 receive a jerked movement and that experience demonstrates that better results are thus obtained than with continuously rotating rollers. The sheet finally obtained is caught between bands 33 and 34 and it is thus led to the cutting mechanism. The movable cutter 44 (Fig. 8) cuts successive transverse bands of vertical fibres which are pushed across the upper face of the fixed cutter 43 and then into the guide formed by flap 57 and lining 65 to form therein a continuous mass or layer of fibres which passes on table 66, under roller 67 and is finally caught between fabric 69 and endless band 68. This layer of vertical fibres is glued onto the lower side of fabric 69 by the solution sprayed by sprayers 71 and which permeates through the said fabric. Fabric 69 then passes through the drier, not illustrated, wherein the glueing solution is dried, vulcanized, polymerized, etc.

Figure 9:
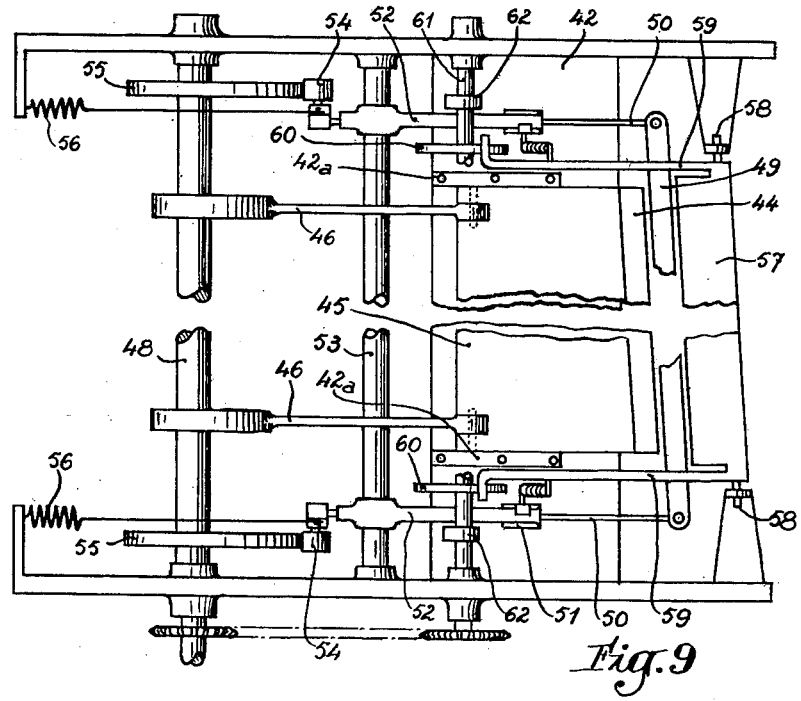
Fig. 9 is a plan view corresponding to Fig. 8.

Figs. 11 to 23 show the successive steps of an operative cycle. At the beginning thereof (position of Figs. 11 and 12) the movable cutter 44 is at its rearmost position. The pusher member 49 rests on the fixed cutter 43 along the rear edge or cutting edge thereof. Flap 57 (not shown in Fig. 12) is at its lowered position at which it presses on lining 65 the mass or layer 97 of vertical fibres formed during the previous cycles. The last-cut band of fibres 98 is on fixed cutter 43 between pusher member 49 and flap 57 as it will be explained. The movable cutter 44 must be somewhat oblique and its obliquity has been exaggerated in Figs. 9 and 12 for the sake of clearness. In order to correspond to this obliquity flap 57 and its shaft 58 are also disposed obliquely as shown in Fig. 9.

The first step consists in an upward movement of the sheet 25 of longitudinal fibres, which is effected by means of bands 33 and 34. In Fig. 11 this rising movement of the sheet has already taken place.

The movable cutter 44 then effects its forward stroke (Figs. 13 and 14) and cuts a transverse band at the upper end of sheet 25. Owing to the obliquity of cutter 44 this cutting operation is effected progressively as indicated in Fig. 14, the cutting point running from one edge to sheet 25 to the other. The advancing cutter pushes member 49 against the action of springs 56. Due to the obliquity of cutter 44 member 49 is not pushed bodily but progressively, starting from one end, and it progressively assumes the same obliquity as the cutter itself. In Fig. 14 for the clearness of the drawing it has been supposed that sheet 25 was quite incompressible, but in fact such is not the case and the band cut by cutter 44 applies regularly against member 49 as indicated in Fig. 15.

It may be of advantage in some cases to use a slightly convex pusher member 49 in order that sheet 25 may be more firmly clamped between the said member and cutter 44 in the zone of the cutting point. It is apparent from Fig. 14 that if the rear edge of member 49 were curved it would fit more exactly against the front edge of sheet 25.

At the end of the forward stroke of cutter 44 (Figs. 16 and 17) the latter has fully cut a band 99 of vertical fibres which is clamped between the front edge of the said cutter and pusher member 49. The latter has itself been pushed forwardly and it has thus engaged under flap 57 the band 98 which had been cut during the previous cycle. Cam 60 (Fig. 8) is so timed that flap 57 is raised when band 98 is thus engaged against the mass or layer 97 of vertical fibres formed during the preceding cycles (Figs. 16 and 17). It will be noted in Fig. 16 that the front face of pusher member 49 is formed with a slightly protruding rib whereby it may engage band 98 under flap 57 without interfering with the rear edge of the latter.

During the next operative step flap 57 is lowered to clamp band 98 between its lower toothed face and lining 65. Cutter 44 begins its rearward stroke together with pusher member 49 which is returned rearwardly by springs 56. But after a very short time rollers 54 abut against the periphery of cams 55 (Fig. 8) and the rearward movement of member 49 is stopped (Figs. 18 and 19). The last band 99 has been somewhat returned backwards, but it is now spaced from cutter 44 which is still moving rearwardly.

Rollers 54 are then actuated by a small notch 55a (Fig. 8) provided on each cam 55, whereby member 49 is caused to move slightly backwards and immediately thereafter forwards through a very small distance. Band 99 is thus slightly pushed backwards and becomes spaced from the said member 49. In Fig. 18 this slight rearward and forward movement or oscillation of member 49 has not yet taken place and band 99 is still in contact with member 49, while in the plan view of Fig. 19 the said oscillation has been effected and band 99 is spaced from member 49. It will be noted that cams 55 are so arranged that member 49 remains oblique as the cutting edge of cutter 44.

During the last step of the cycle cams 62 (Fig. 8) cause supports 52 to rise under the action of springs 64. Rods 50 are thus raised together with member 49 (position of Fig. 20) while the latter is progressively returned rearwardly by springs 56 under control of cams 55. Cams 62 then lower supports 52 and member 49 and cams 55 are so shaped that the latter is brought back to the transverse position of Fig. 12. A new operative cycle may now begin.

As in the case of the machine of Figs. 1 to 5, the mass or layer 97 of vertical fibres is under compression and therefore tends to expand horizontally.

Towards the front of the machine (towards the right in Fig. 20) expansion of layer 97 is prevented by the endless band 68 and the fabric 69 which form two movable jaws between which the said layer is clamped.

Lateral expansion of layer 97 may be prevented by appropriate lateral guides, not illustrated. Experience besides demonstrates that lateral expansion only causes defects along a relatively narrow marginal zone of the finished article, which may often be neglected.

In a rearward direction expansion of layer 97 is prevented by the ratchet teeth of flap 57 and by the steel wire lining 65 which effectively retain the ends of the fibres. When flap 57 is raised (position of Fig. 16) layer 97 is retained by member 49 itself during engagement of the last band 98.

Considering now Figs. 11, 13, 18 and 20, it will be appreciated that during a part of the operative cycle of the machine a fibre band 98 or 99 is freely supported by the fixed cutter 43 without being maintained or clamped in any manner. In such a band the fibres situated along the free rear or front face of the band are liable to fall down. These fibres will thereafter be disposed obliquely or horizontally in layer 97 and the finished article will be defective.

This may be avoided by disposing above the fixed cutter 43 an electrically insulated high voltage electrode 100 (Fig. 21). Such an electrode forms with cutter 43 a condenser with parallel armatures between which there is created an intense electrostatic field with substantially vertical lines of forces as indicated in dotted lines in Fig. 21. This electrostatic field acts on the fibres which are thus retained vertically. It is important to remark that here, in contradistinction with the known electrostatic machines for the manufacture of pile articles, the electrostatic field has not to displace the fibres in order to form therewith a regular layer of vertical fibres, but only to retain at the vertical position the fibres of such a layer previously formed by mechanical means. This is a substantial difference since electrode 100 may perfectly retain vertically fibres of relatively great length, while it could only bring to the vertical position very short fibres.

In the arrangement of Fig. 21 all the parts adjacent to electrode 100 should of course be made of an insulating material, and more particularly pusher member 49, flap 57 and rods 50.

I claim:

1. A machine for the manufacture of pile articles comprising means to cut successive transverse bands of equal width in a sheet of longitudinally parallelized fibres; a substantially horizontal guide to receive said bands with the fibres perpendicular to the faces of said guide, said guide having an openable upper wall; means to successively engage said bands into said guide with the bands transversely disposed with respect to said guide to form therein a continuous layer of fibres directed perpendicularly to the faces of said layer; means to open the upper wall of said guide to receive each successive band as it is being engaged into said guide and to thereafter close said upper wall to clamp said last-named band; and means to apply and to glue said layer on a pile support.

2. In a machine as claimed in claim 1, the inner faces of said guide being provided with teeth.

3. In a machine as claimed in claim 1, the inner faces of said guide being provided with inclined teeth.

4. In a machine as claimed in claim 1, the inner faces of said guide being in the form of a steel wire lining with the ends of the wires bent towards the outlet of said guide.

5. A machine for the manufacture of pile articles comprising a fixed cutter having a substantially horizontal upper face; a movable cutter reciprocatable in the horizontal plane of the upper face of said fixed cutter to cooperate therewith; means to reciprocate said movable cutter; means to upwardly advance a substantially vertical sheet of longitudinally parallelized fibres between said movable and said fixed cutter at each stroke of said movable cutter to cause same to cut in said sheet a transverse band of fibres of equal length which is pushed on the upper face of said fixed cutter with the fibres of said band standing on end on said upper face; a guide horizontally disposed in front of said fixed cutter to receive in succession the bands cut by said movable cutter; a transverse pusher member adapted to rest on the upper face of said fixed cutter to form an abutment against which the band of fibres being cut is pressed by said cutter during the cutting stroke thereof; elastic means to maintain said pusher member in position on the upper face of said fixed cutter while permitting said pusher member to advance under the pushing action of said movable cutter to engage into said guide the band of fibres cut during the preceding forward stroke of said movable cutter so as to form within said guide a continuous layer of fibres with the fibres directed perpendicularly to the faces of said layer; means to progressively return backward said pusher member during the return stroke of said movable cutter; means to first raise said pusher member at the beginning of the return movement thereof to cause said member to pass above the last-cut band of fibres, and to thereafter lower said pusher member to bring back same to its initial position on the upper face of said fixed cutter and behind said last-cut band; and means to apply and to glue on a pile support the layer of fibres issuing from said guide.

6. In a machine as claimed in claim 5, means to impart to said pusher member a small forward movement before the raising step of said pusher member to disengage same from the last-cut band of fibres.

7. In a machine as claimed in claim 5, a high-voltage electrode disposed above said fixed cutter to electrostatically maintain at the vertical position the fibres of the successive fibre bands resting on said fixed cutter.

8. In a machine as claimed in claim 5, a high-voltage electrode disposed above said fixed cutter to electrostatically maintain at the vertical position the fibres of the successive fibre bands resting on said fixed cutter, said fixed cutter being metallic and the other parts of said machine adjacent said electrode being made of insulating material.

9. A machine for the manufacture of pile articles comprising means to form a fleece of superimposed card webs; means to continuously form successive folds from said fleece; a movable support to receive said successive folds in the form of a continuous fibrous mass; means to stretch said fibrous mass to form therefrom a continuous sheet of longitudinally parallelized fibres, said stretching means being driven step by step; means to cut successive bands from said sheet in unison with the step by step motion of said stretching means; means to feed said sheet step by step to said cutting means in unison with the operation of said cutting means; a guide to receive said bands with the fibres perpendicular to the faces of said guide; means to successively engage said bands into said guide with the bands transversely disposed with respect to said guide to form therefrom a continuous layer of fibres directed perpendicularly to the faces of said layer; and means to apply and to glue said layer on a pile support.

10. A machine for the manufacture of pile articles, comprising means to cut successive bands of equal width in a sheet of longitudinally parallelized fibres; a guide to receive said bands with the fibres perpendicular to the faces of said guide; means to successively engage said bands into said guide with the bands transversely disposed with respect to said guide to form therein a continuous layer of fibres directed perpendicularly to the faces of said layer; teeth on the inner faces of said guide to retain the ends of the fibres against displacement under the action of the tendency of said layer to expand while permitting said layer to advance under the action of the successive bands engaged into said guide; and means to apply and to glue said layer on a pile support.

11. A machine for the manufacture of pile articles, comprising means to cut successive bands of equal width in a sheet of longitudinally parallelized fibres; a guide to receive said bands with the fibres perpendicular to the faces of said guide; means to successively engage said bands into said giude with the bands transversely disposed with respect to said guide to form therein a continuous layer of fibres directed perpendicularly to the faces of said layer; ratchet teeth on the inner faces of said guide to retain the ends of the fibres against displacement under the action of the tendency of said layer to expand while permitting said layer to advance under the action of the successive bands engaged into said guide; and means to apply and to glue said layer on a pile support.

12. A machine for the manufacture of pile articles, comprising means to cut successive bands of equal width in a sheet of longitudinally parallelized fibres; a guide to receive said bands with the fibres perpendicular to the faces of said guide; means to successively engage said bands into said guide with the bands transversely disposed with respect to said guide to form therein a continuous layer of fibres directed perpendicularly to the faces of said layer; a steel wire lining on the inner faces of said guide with the ends of the wires bent towards the outlet of the guide to retain the ends of the fibres against displacement under the action of the tendency of said layer to expand while permitting said layer to advance under the action of the successive bands engaged into said guide; and means to apply and to glue said layer on a pile support.

References Cited in the file of this patent

UNITED STATES PATENTS

| | | |
|---|---|---|
| 1,194,874 | Peterson | Aug. 15, 1916 |
| 1,864,478 | Ward | June 21, 1932 |
| 2,237,049 | Cavedon | Apr. 1, 1941 |
| 2,563,259 | Miller | Aug. 7, 1951 |
| 2,609,320 | Modigliani | Sept. 2, 1952 |